(12) United States Patent
Mizuno et al.

(10) Patent No.: US 8,415,849 B2
(45) Date of Patent: Apr. 9, 2013

(54) IPM ROTOR AND IPM ROTOR MANUFACTURING METHOD

(75) Inventors: Yota Mizuno, Nisshin (JP); Hiroshi Hata, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/227,906

(22) PCT Filed: Jul. 4, 2007

(86) PCT No.: PCT/JP2007/063772
§ 371 (c)(1),
(2), (4) Date: Dec. 2, 2008

(87) PCT Pub. No.: WO2008/007679
PCT Pub. Date: Jan. 17, 2008

(65) Prior Publication Data
US 2009/0278417 A1    Nov. 12, 2009

(30) Foreign Application Priority Data
Jul. 10, 2006    (JP) ................................. 2006-189496

(51) Int. Cl.
*H02K 1/27*    (2006.01)
*H02K 15/03*   (2006.01)
(52) U.S. Cl. .............................. 310/156.53; 310/156.56
(58) Field of Classification Search ............. 310/156.53, 310/156.56
See application file for complete search history.

(56) References Cited

U.S. PATENT DOCUMENTS

| | | | | |
|---|---|---|---|---|
| 5,519,467 A | * | 5/1996 | Suzuki et al. | 359/484.03 |
| 5,864,191 A | * | 1/1999 | Nagate et al. | 310/156.54 |
| 6,353,275 B1 | * | 3/2002 | Nishiyama et al. | 310/156.53 |
| 2006/0186752 A1 | * | 8/2006 | Matsumoto et al. | 310/156.53 |
| 2007/0145849 A1 | * | 6/2007 | Okamoto et al. | 310/156.53 |

FOREIGN PATENT DOCUMENTS

| | | | |
|---|---|---|---|
| EP | 1 801 955 A1 | | 6/2007 |
| JP | A-53-136610 | | 11/1978 |
| JP | 02041638 A | * | 2/1990 |
| JP | A-4-38134 | | 2/1992 |
| JP | 07312853 A | * | 11/1995 |
| JP | 07322576 A | * | 12/1995 |
| JP | A-9-163649 | | 6/1997 |
| JP | A-9-215236 | | 8/1997 |
| JP | 11098735 A | * | 4/1999 |
| JP | 2001157394 A | * | 6/2001 |
| JP | A-2001-157394 | | 6/2001 |

(Continued)

OTHER PUBLICATIONS

Notice of Grounds of Rejection mailed on Jun. 15, 2010 in corresponding Japanese Patent Application No. 189496/2006 (with translation).

(Continued)

*Primary Examiner* — Tran Nguyen
*Assistant Examiner* — Alex W Mok
(74) *Attorney, Agent, or Firm* — Oliff & Berridge, PLC

(57) ABSTRACT

An injection apparatus includes a gate for injecting a filler to a gap between an inner wall of a slot and a permanent magnet. A plurality of gates are provided for one slot. An IPM rotor with improved NV characteristics, and method and apparatus for manufacturing such an IPM rotor can be provided by such a structure.

3 Claims, 11 Drawing Sheets

FOREIGN PATENT DOCUMENTS

| | | | |
|---|---|---|---|
| JP | 2002034187 A | * | 1/2002 |
| JP | A-2002-34187 | | 1/2002 |
| JP | A-2005-12859 | | 1/2005 |
| JP | 2005304247 A | * | 10/2005 |
| JP | B1-3786946 | | 6/2006 |
| JP | 2006246560 A | * | 9/2006 |
| JP | 2006296125 A | * | 10/2006 |
| JP | 2006345600 A | * | 12/2006 |
| JP | 2007049787 A | * | 2/2007 |
| JP | 2007159223 A | * | 6/2007 |
| WO | WO 03/005531 A1 | | 1/2003 |
| WO | WO 2006/077998 A1 | | 7/2006 |
| WO | WO 2006090567 A1 | * | 8/2006 |
| WO | WO 2006117891 A1 | * | 11/2006 |
| WO | WO 2007007420 A1 | * | 1/2007 |
| WO | WO 2007026900 A1 | * | 3/2007 |

OTHER PUBLICATIONS

Chinese Office Action issued in Chinese Patent Application No. 200780026110.3 on Oct. 27, 2010 (with translation).

* cited by examiner

IPM ROTOR AND IPM ROTOR MANUFACTURING METHOD

TECHNICAL FIELD

The present invention generally relates to an IPM (Interior Permanent Magnet) rotor, a method of manufacturing the IPM rotor and an apparatus for manufacturing the IPM rotor. More specifically, the present invention relates to an IPM rotor in which a filler is introduced to a gap between a magnet and an inner wall of a slot for holding the magnet embedded in a core body, as well as to a method of manufacturing the IPM rotor and an apparatus for manufacturing the IPM rotor.

BACKGROUND ART

In connection with conventional IPM rotors, Japanese Patent Laying-Open No. 2002-034187, for example, discloses a magnet embedded rotor aimed at attaining higher reliability (Patent Document 1). The magnet embedded rotor includes a laminated core having a plurality of holes formed therein, permanent magnets inserted to respective holes, and resin member introduced to each hole. Patent Document 1 further discloses an injection metal mold used for manufacturing the magnet embedded rotor. The injection metal mold includes a lower mold to which the laminated core is inserted, and an upper mold having injection holes for supplying resin to respective holes. One injection hole is provided for one hole.

Japanese Patent Laying-Open No. 09-163649 discloses a permanent magnet embedding type motor in which a crack or chipping of the magnet is prevented when the permanent magnet is inserted to a rotor core, for realizing small size, high output and high reliability (Patent Document 2). According to Patent Document 2, an adhesive sheet impregnated with an adhesive or having an adhesive applied, is arranged in a slit hole to which the permanent magnet is inserted.

Japanese Patent Laying-Open No. 2005-012859 discloses a rotor of a motor aimed at improving thermal conductivity between a permanent magnet and a rotor core (Patent Document 3). According to Patent Document 3, a magnet insertion hole is formed in the rotor core. On a surface of the permanent magnet to be in contact with the magnet insertion hole, a coating layer of an elastic material is formed.

As disclosed in Patent Document 1, it has been known to fill a resin material in a gap between the rotor core and the permanent magnet to hold the permanent magnet, when the permanent magnet is embedded in the rotor core. The resin, however, has low fluidity and, therefore, it is possible that the gap is not fully filled with the resin. In such a case, NV (Noise and Vibration) characteristics of the IPM rotor may possibly be degraded.

DISCLOSURE OF THE INVENTION

An object of the present invention is to solve the above-described problems, and its object is to provide an IPM rotor with improved NV characteristics, a method of manufacturing the IPM rotor and an apparatus for manufacturing the IPM rotor.

According to an aspect, the present invention provides an apparatus for manufacturing an IPM rotor having a magnet embedded in each of a plurality of slots formed in a core body. The apparatus for manufacturing the IPM rotor includes an inlet for injecting a filler to a gap between an inner wall of the slot and the magnet. A plurality of inlets are provided for one slot.

In the apparatus for manufacturing the IPM rotor structured as described above, a plurality of inlets are provided and, therefore, it is possible to sufficiently fill the gap between the magnet and the inner wall of the slot with the filler. Consequently, coupling rigidity between the magnet and the core body can be enhanced, and NV characteristics of the IPM rotor can be improved.

Preferably, the slot is formed at a position spaced in a radial direction from a rotation axis of the core body. The gap includes an inner circumferential portion formed inner than the magnet and an outer circumferential portion formed outer than the magnet with the rotation axis being the center. The filler is injected to the inner circumferential portion and the outer circumferential portion through the plurality of inlets. In the apparatus for manufacturing the IPM rotor structured as described above, particularly the inner circumferential portion and the outer circumferential portion of the gap can sufficiently be filled with the filler. Consequently, the magnet can more reliably be held on the core body against centrifugal force acting on the magnet when the core body rotates.

Preferably, through the plurality of inlets, the filler is injected to a plurality of portions of the inner circumferential portion and a plurality of portions of the outer circumferential portion. In the apparatus for manufacturing the IPM rotor structured as described above, the magnet can more reliably be held on the core body when the core body rotates.

Preferably, the gap includes a first side and a second side extending in mutually different directions along the outer circumference of the magnet and a corner portion where the first side and the second side intersect with each other. The filler is injected to the corner portions through the plurality of inlets. In the apparatus for manufacturing the IPM rotor structured as described above, the filler is introduced to the corner portion where the fluidity of the filler injected to the gap lowers significantly. Therefore, sufficient filling with the filler becomes possible.

According to another aspect, the present invention provides a method of manufacturing an IPM rotor having a magnet embedded in each of a plurality of slots formed in a core body. The core body includes an end surface at which the slot is opened. A gap extending annularly along an outer circumference of the magnet is formed between the magnet and an inner wall of the slot. The method of manufacturing the IPM rotor includes the steps of: inserting the magnet to the slot; and injecting a filler to the gap from a plurality of portions-opposite to the end surface and displaced in the circumferential direction in which the gap extends.

By the method of manufacturing the IPM rotor as described above, the filler is introduced to the gap at a plurality of portions displaced in the circumferential direction along which the gap extends, and therefore, sufficient filling with the filler becomes possible. Consequently, coupling rigidity between the magnet and the core body is enhanced, and NV characteristics of the IPM rotor can be improved.

Preferably, the step of injecting the filler includes the steps of placing a solid filler on the end surface, and causing the filler to flow into the gap by melting the solid filler. As the filler flows to the gap because of the weight of itself, sufficient filling is difficult. Therefore, the method of manufacturing the IPM rotor of the present invention as described above is effectively applied, as the filling characteristic of the filler can be improved by the present invention.

According to a further aspect, the present invention provides an IPM rotor including a core body, a magnet and a holding member. The core body includes an end surface. The core body has a slot formed therein, opening at the end surface. The magnet is inserted to the slot. The holding member is formed of a filler injected to a gap between an inner wall of the slot and the magnet. The holding member holds the magnet on the core body. The holding member includes a plurality of injection traces of the filler formed as thin films on the end surface arranged spaced from each other along an opening edge of the slot.

By the IPM rotor structured as described above, the filler is injected to the gap from a plurality of portions along the opening edge of the slot, and hence, sufficient filling with the filler becomes possible. Consequently, coupling rigidity between the magnet and the core body attained by the holding member is enhanced, and the NV characteristics of the IPM rotor can be improved.

As described above, according to the present invention, an IPM rotor with improved NV characteristics, a method of manufacturing the IPM rotor and an apparatus for manufacturing the IPM rotor can be provided.

BEST MODES FOR CARRYING OUT THE INVENTION

Figure 1:
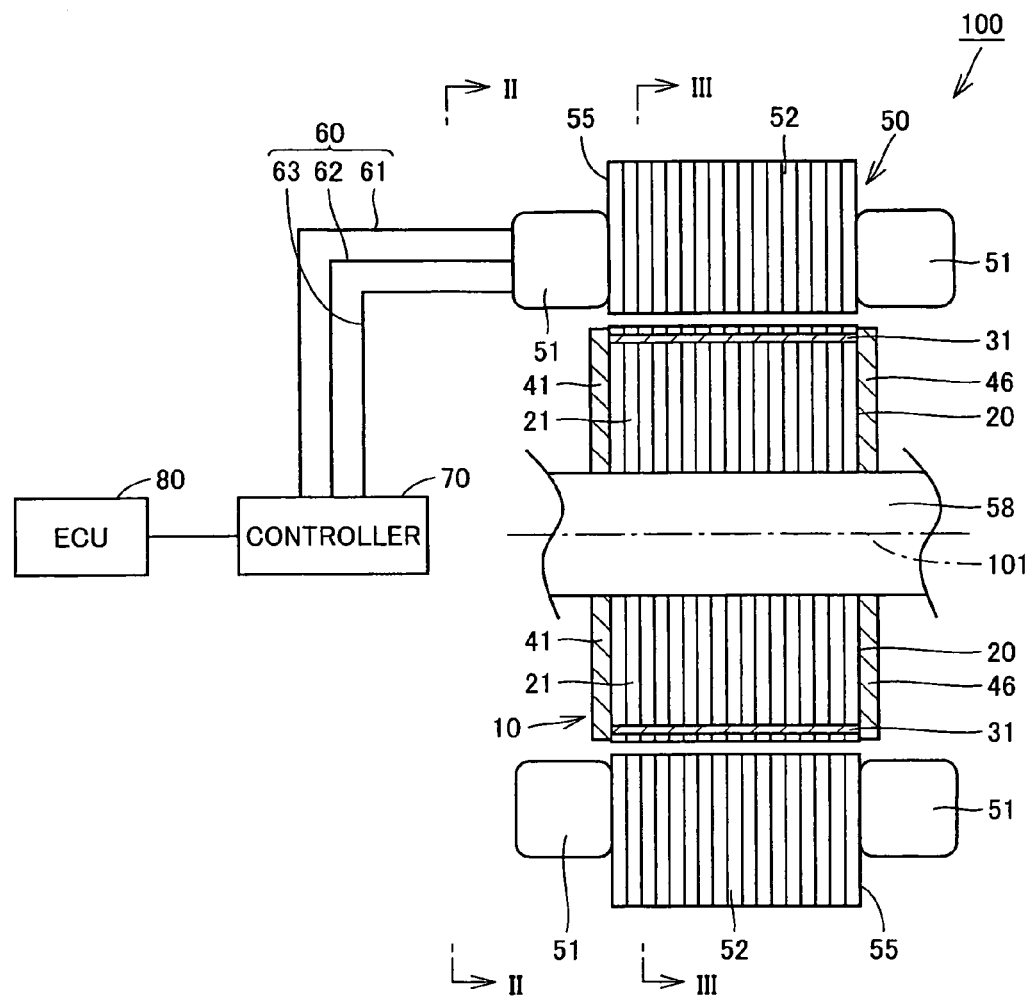
FIG. 1 is a cross-sectional view schematically showing a motor installed in a hybrid vehicle.

Embodiments of the present invention will be described with reference to the figures. In the figures referred to in the following, the same or corresponding members are denoted by the same reference characters.

Embodiment 1

FIG. 1 is a cross-sectional view schematically showing a motor installed in a hybrid vehicle. The hybrid vehicle having the motor installed shown in this figure uses, as power sources, an internal combustion engine such as a gasoline engine or a diesel engine, and a rechargeable secondary battery (battery).

Referring to FIG. 1, a motor 100 includes an IPM rotor 10 and a stator 50 arranged on an outer circumference of IPM rotor 10. IPM rotor 10 is provided on a shaft 58 extending along a central axis 101. Shaft 58 rotates, together with IPM rotor 10, about the central axis 101.

IPM rotor 10 includes a rotor core 20, a permanent magnet 31 embedded in rotor core 20, and a holding member, not shown, for holding permanent magnet 31 on rotor core 20. Rotor core 20 has a cylindrical shape extending along the central axis 101. Rotor core 20 includes a plurality of magnetic steel sheets stacked in the axial direction of central axis 101.

Stator 50 includes a stator core 55 and a coil 51 wound around stator core 55. Stator core 55 includes a plurality of magnetic steel sheets 52 stacked in the axial direction of central axis 101. The material of rotor core 20 and stator core 55 is not limited to magnetic steel sheets, and these may be formed of a magnetic material such as a powder magnetic core.

Coil 51 is electrically connected to a controller 70 by a three-phase cable 60. Three-phase cable 60 consists of a U-phase cable 61, a V-phase cable 62 and a W-phase cable 63. Coil 51 consists of a U-phase coil, a V-phase coil and a W-phase coil, and to the terminals of these three coils, U-phase cable 61, V-phase cable 62 and W-phase cable 63 are connected, respectively.

A torque command value to be output by motor 100 is transmitted to controller 70 from an ECU (Electrical Control Unit) 80 mounted on the hybrid vehicle. Controller 70 generates a motor control current for outputting the torque designated by the torque command value, and supplies the motor control current to coil 51 through three-phase cable 60.

Figure 2:
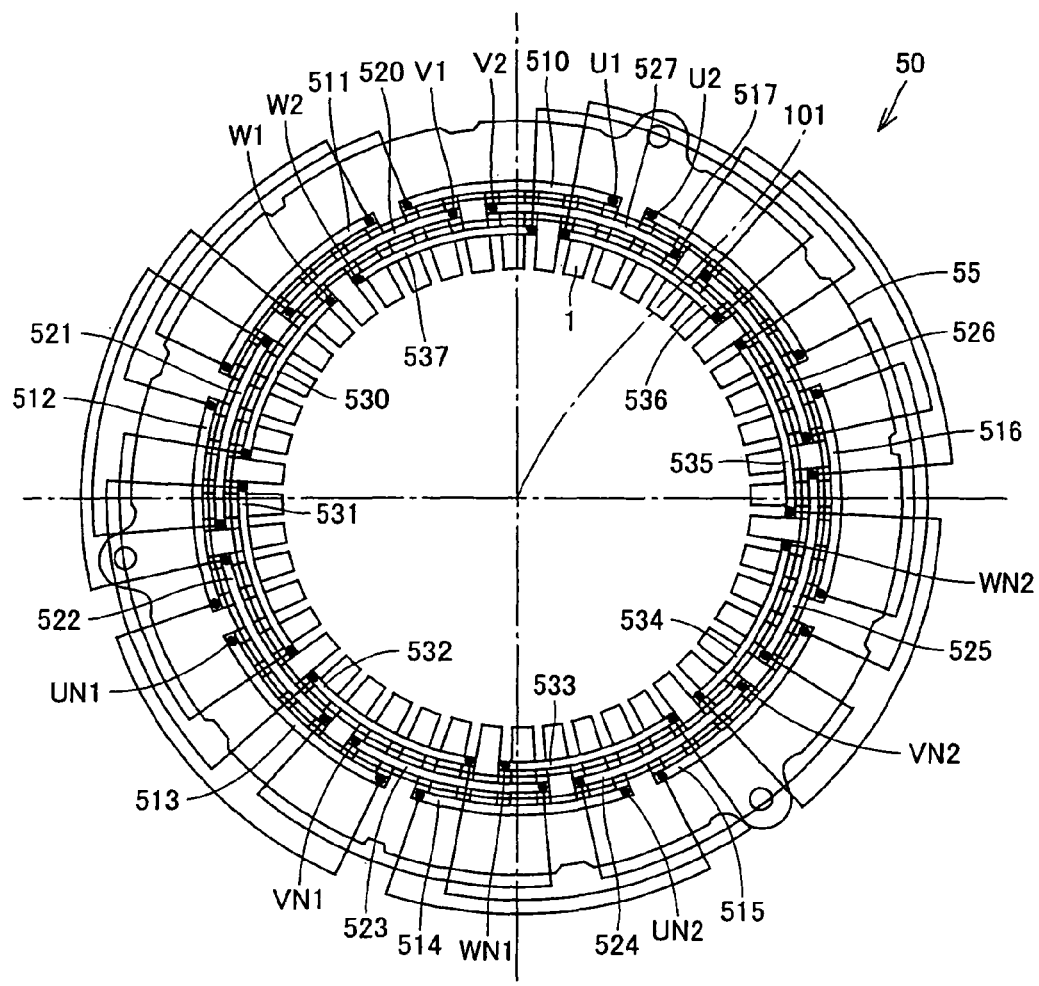
FIG. 2 is an end view of a stator taken along the line II-II of FIG. 1.

FIG. 2 is an end view of a stator taken along the line II-II of FIG. 1. This figure schematically shows the winding structure of the motor.

Referring to FIGS. 1 and 2, stator core 55 has a cylindrical shape extending along the central axis 101. Stator core 55 includes, on an inner circumferential surface, a plurality of teeth 1 arranged in the circumferential direction with the central axis 101 being the center. In the present embodiment, stator core 55 has 48 teeth 1.

Coil 51 consists of coils 510 to 517 forming the U-phase coil, coils 520 to 527 forming the V-phase coil, and coils 530 to 537 forming the W-phase coil. Coils 510 to 517, 520 to 527 and 530 to 537 are each wound around a plurality of teeth 1 continuous in the circumferential direction. Coils 510 to 517 are arranged on an outermost circumference. Coils 520 to 527 are arranged inner than coils 510 to 517, at positions displaced by a prescribed phase in the circumferential direction from coils 510 to 517, respectively. Coils 530 to 537 are arranged inner than coils 520 to 527, at positions displaced by a prescribed phase in the circumferential direction from coils 520 to 527, respectively.

Coils 510 to 513 are connected in series, with one end thereof being a terminal U1 and the other end being a neutral point UN1. Coils 514 to 517 are connected in series, with one end thereof being a terminal U2 and the other end being a neutral point UN2.

Coils 520 to 523 are connected in series, with one end thereof being a terminal V1 and the other end being a neutral point VN1. Coils 524 to 527 are connected in series, with one end thereof being a terminal V2 and the other end being a neutral point VN2.

Coils 530 to 533 are connected in series, with one end thereof being a terminal W1 and the other end being a neutral point WN1. Coils 534 to 537 are connected in series, with one end thereof being a terminal W2 and the other end being a neutral point WN2.

Neutral points UN1, UN2, VN1, VN2, WN1 and WN2 are commonly connected to one point. Terminals U1 and U2 are connected to U-phase cable 61 of three-phase cable 60, terminals V1 and V2 are connected to V-phase cable 62, and terminals W1 and W2 are connected to W-phase cable 63.

Figure 3:
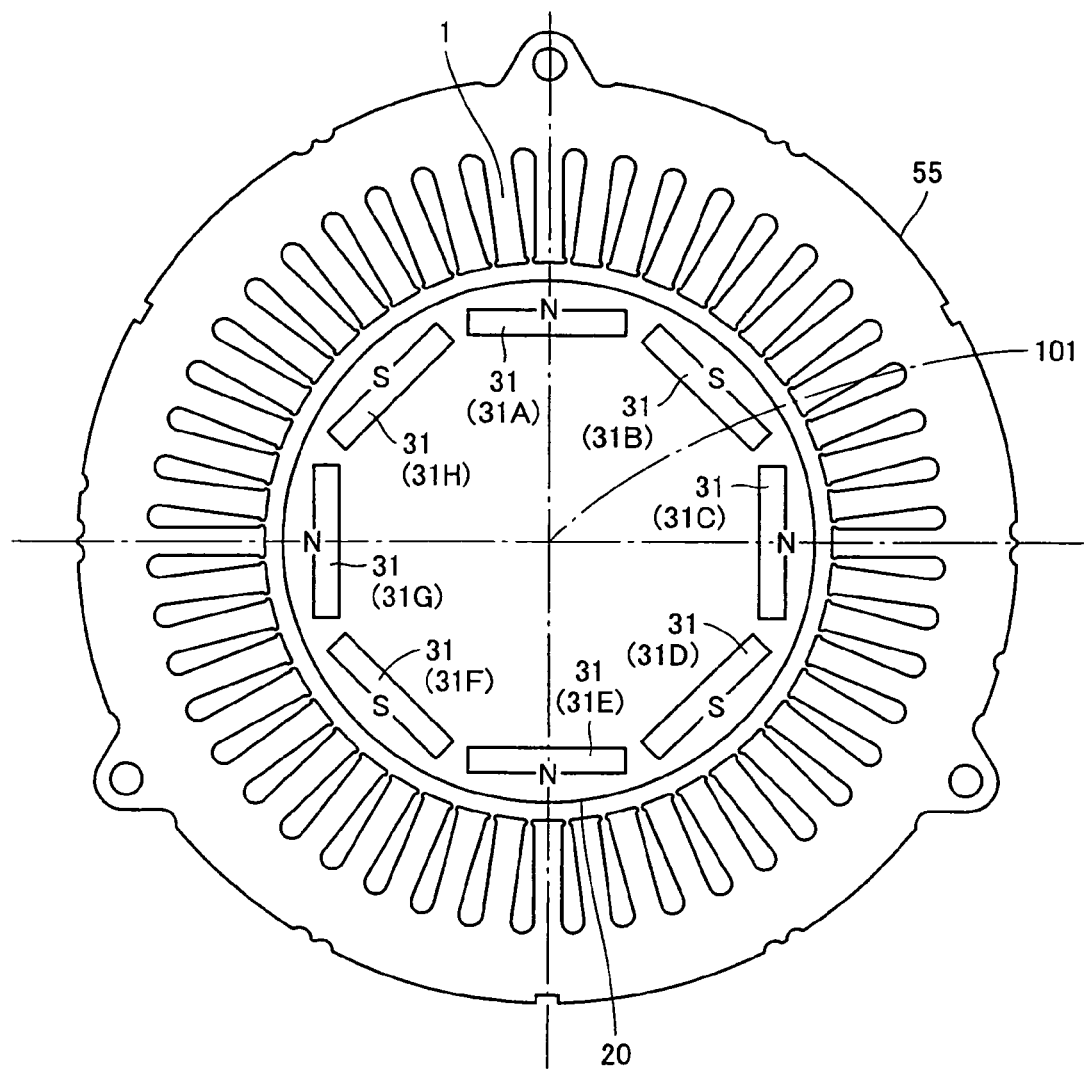
FIG. 3 is a cross-sectional view of the motor taken along the line III-III of FIG. 1.

FIG. 3 is a cross-sectional view of the motor taken along the line III-III of FIG. 1. Referring to FIG. 3, a plurality of permanent magnets 31 are arranged in the circumferential direction with the central axis 101 being the center. In the present embodiment, eight (8) permanent magnets 31 are arranged. Permanent magnet 31 has an approximately rectangular solid shape. When viewed from the axial direction of central axis 101, permanent magnet 31 has an approximately rectangular shape.

Permanent magnets 31A, 31C, 31E and 31G are arranged such that the N-pole is on the outer circumferential side of rotor core 20. Permanent magnets 31B, 31D, 31F and 31H are arranged such that the S-pole is on the outer circumferential side of rotor core 20. In this manner, permanent magnets 31 are polarized in the radial direction with central axis 101 being the center, and arranged such that neighboring magnets have reversed polarities. Coils 510 to 517, 520 to 527 and 530 to 537 shown in FIG. 2 are arranged to be opposite to these permanent magnets 31 (31A to 31H).

The number of teeth is determined to be an integer multiple of the number of permanent magnets 31 embedded in rotor core 20. The number of teeth 1 and the number of permanent magnets 31 are not limited to those described with reference to the present embodiment.

Figure 4:
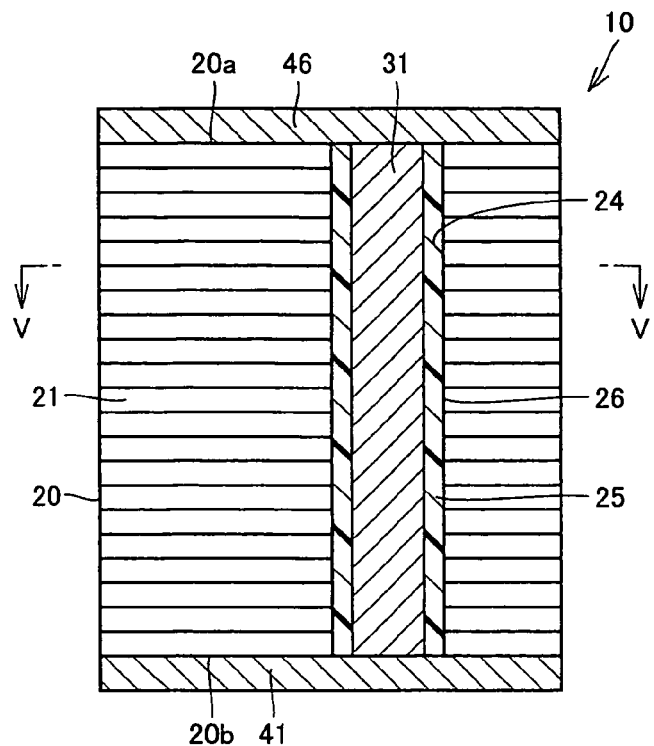
FIG. 4 is a cross-sectional view showing detailed shape of an IPM rotor shown in FIG. 1.
Figure 5:
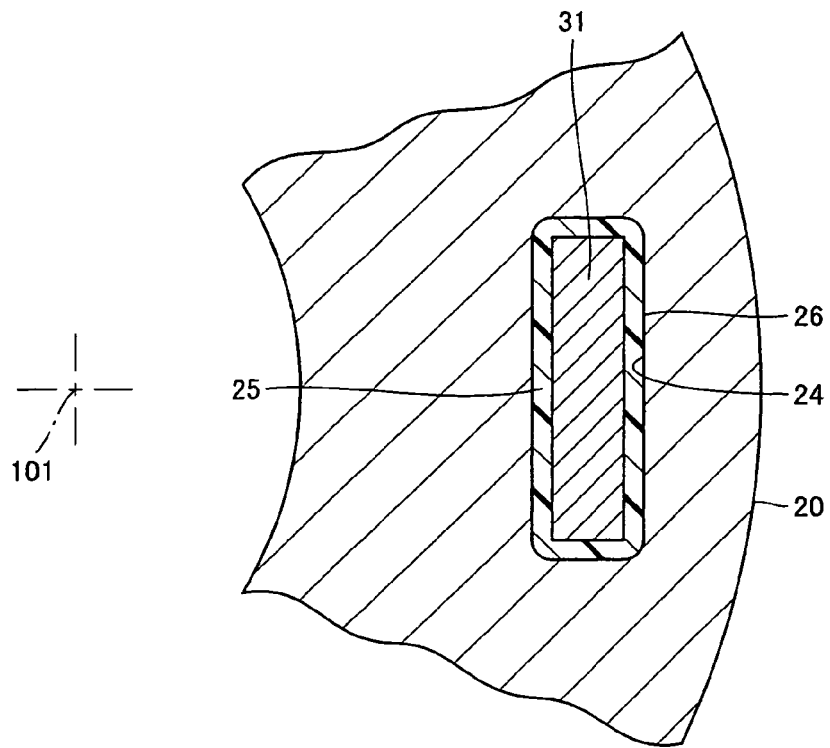
FIG. 5 is a cross-sectional view of the IPM rotor taken along the line V-V of FIG. 4.

FIG. 4 is a cross-sectional view showing a detailed shape of the IPM rotor shown in FIG. 1. This figure shows a cross-sectional shape of IPM rotor cut along a plane containing the central axis 101 of FIG. 1. FIG. 5 is a cross-sectional view of the IPM rotor taken along the line V-V of FIG. 4.

Referring to FIGS. 4 and 5, rotor core 20 includes an end surface 20a, and an end surface 20b opposite to end surface 20a. End surfaces 20a and 20b extend in planes approximately perpendicular to the central axis 101. End surfaces 20a and 20b are spaced apart in the axial direction of central axis 101. On end surfaces 20a and 20b, end plates 46 and 41 as plate members are fixed, respectively.

A plurality of slots 24 are formed in rotor core 20. Slot 24 is formed at a position spaced in the radial direction from central axis 101. Slot 24 extends in the axial direction of central axis 101, and passes through rotor core 20. Slot 24 is opened at end surfaces 20a and 20b. Slot 24 has a shape conforming to the shape of permanent magnet 31. In each of the plurality of slots, permanent magnet 31 is inserted. In the present embodiment, slot 24 has an approximately rectangular shape when viewed from the axial direction of central axis 101. When viewed from the axial direction of central axis 101, slot 24 has an approximately rectangular shape with an end side extending in the direction perpendicular to the radial direction about central axis 101. The shape of slot 24 is not limited to that shown in FIG. 5 and it may appropriately be modified to conform to the shape of permanent magnet 31.

Between permanent magnet 31 and an inner wall of slot 24, a gap 25 is formed. The inner wall of slot 24 is the surface of rotor core 20 that defines slot 24. When viewed from the axial direction of central axis 101, gap 25 extends annularly along an outer circumference of permanent magnet 31. Gap 25 extends in the axial direction of central axis 101. Gap 25 is formed between end surfaces 20a and 20b. Gap 24 has an approximately constant cross-sectional shape along the axial direction of central axis 101. The width of gap 25 is approximately constant along the outer circumference of permanent magnet 31. The width of gap 25 may vary position to position on the outer circumference of permanent magnet 31. Permanent magnet 31 and the inner wall of slot 24 may partially be in contact with each other.

Gap 25 is filled with a holding member 26. Permanent magnet 31 is held by holding member 26 in slot 24. Permanent magnet 31 is coupled by holding member 26 to rotor core 20. Holding member 26 functions as an adhesive. Holding member 26 is formed of resin material. By way of example, holding member 26 is formed of epoxy, unsaturated polyester, polyamide, polypropylene, polybutylene terephthalate, polyethylene terephthalate, polyphenylene sulfide or the like.

Figure 6:
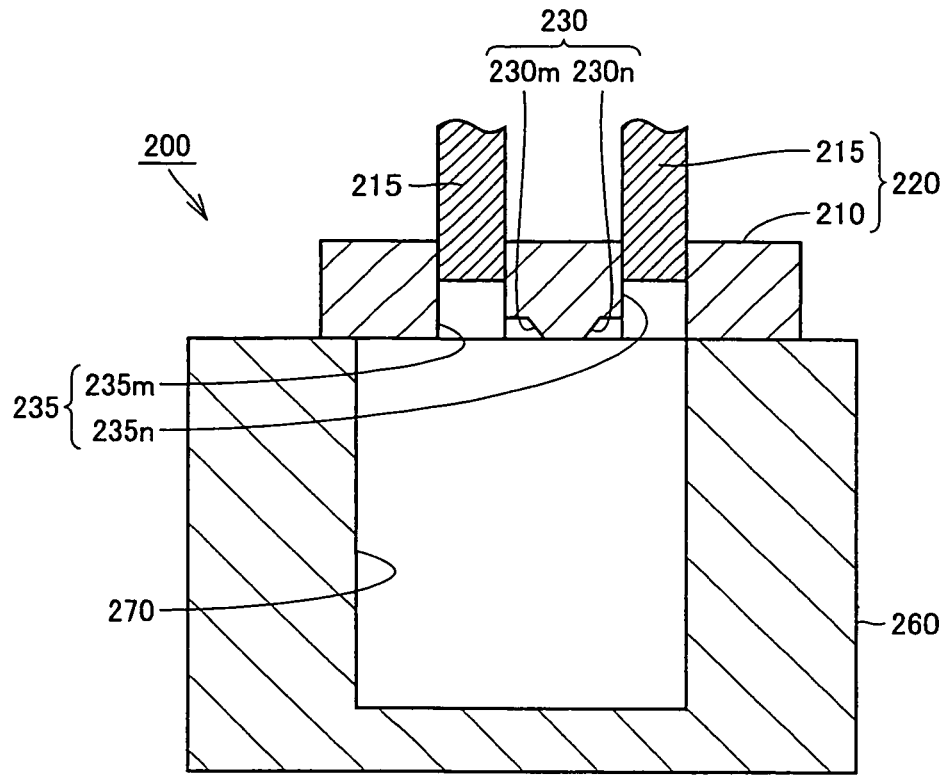
FIG. 6 is a cross-sectional view showing an injection apparatus used for manufacturing the IPM rotor of FIG. 4.

Next, an injection apparatus used for manufacturing IPM rotor 10 shown in FIG. 4 will be described. FIG. 6 is a cross-sectional view showing the injection apparatus used for manufacturing the IPM rotor of FIG. 4.

Referring to FIG. 6, an injection apparatus 200 includes an upper mold 220 and a lower mold 260. In lower mold 260, a recessed portion 270 is formed, in which rotor core 20 is placed. Upper mold 220 includes an injection mold 210 and a pressing mold 215. Injection mold 210 has a pressurizing space 235 formed therein. In pressurizing space 235, a resin 27 having fluidity as the material of holding member 26 is placed, and pressure mold 215 is loaded.

Injection mold 210 has a gate 230 formed therein. Gate 230 is communicated with pressurizing space 235. Gate 230 is for injecting filler 27 arranged in pressurizing space 235 to gap 25. A plurality of gates 230 are provided for one slot 24. Specifically, from a plurality of positions at which the plurality of gates 230 are positioned, filler 27 is introduced to gap 25.

In the present embodiment, two gates 230m and 230n are provided for one slot 24. In injection mold 210, a pressurizing space 235m communicated with gate 230 and a pressurizing space 235n communicated with gate 230n and separate from pressurizing space 235n are provided. Such a configuration is not limiting, and gates 230m and 230n may be communicated with one same pressurizing space 235.

Figure 7:
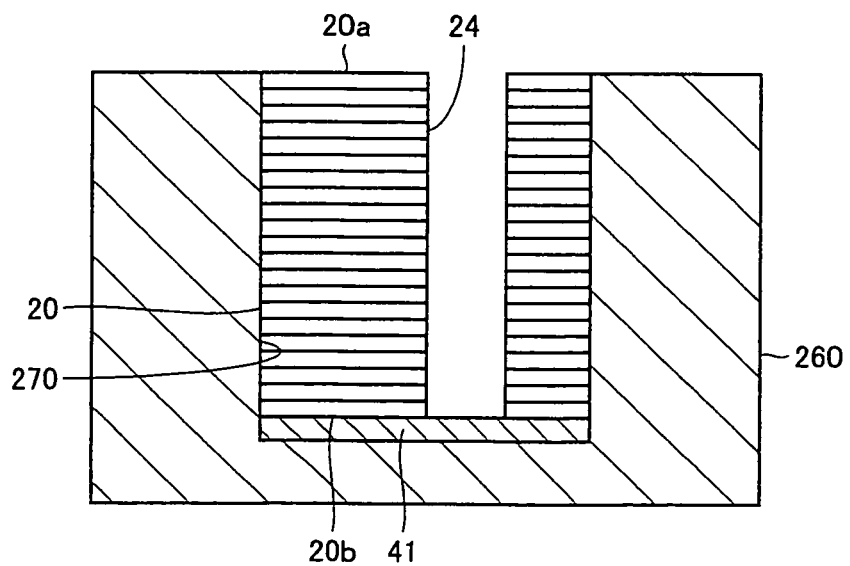
FIG. 7 is a cross-sectional view showing a first step of manufacturing the IPM rotor shown in FIG. 1.
Figure 8:
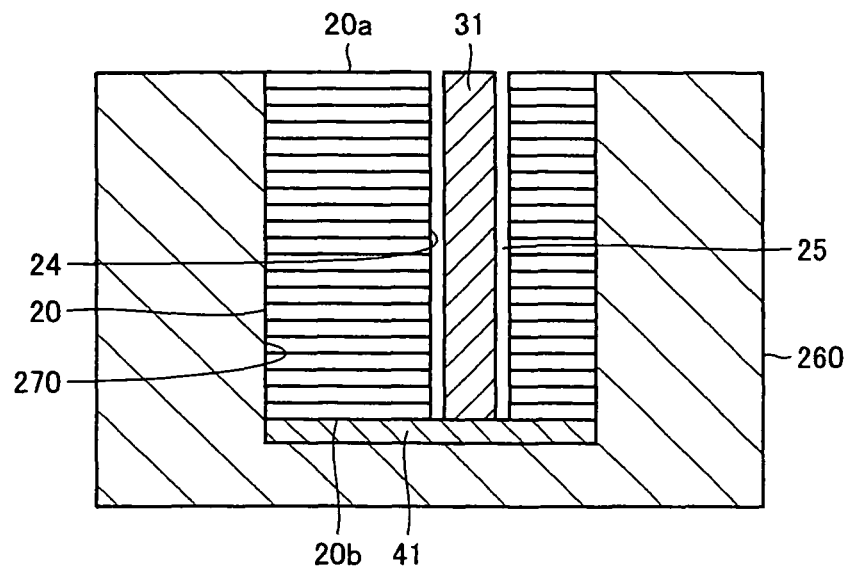
FIG. 8 is a cross-sectional view showing a second step of manufacturing the IPM rotor shown in FIG. 1.
Figure 9:
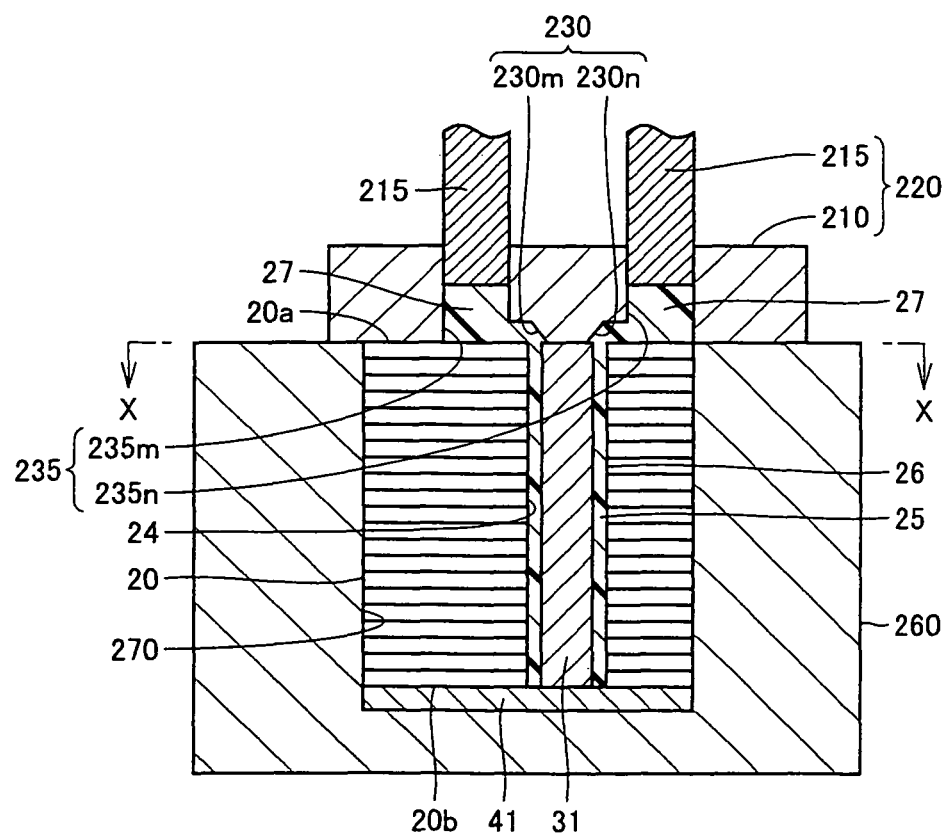
FIG. 9 is a cross-sectional view showing a third step of manufacturing the IPM rotor shown in FIG. 1.
Figure 10:
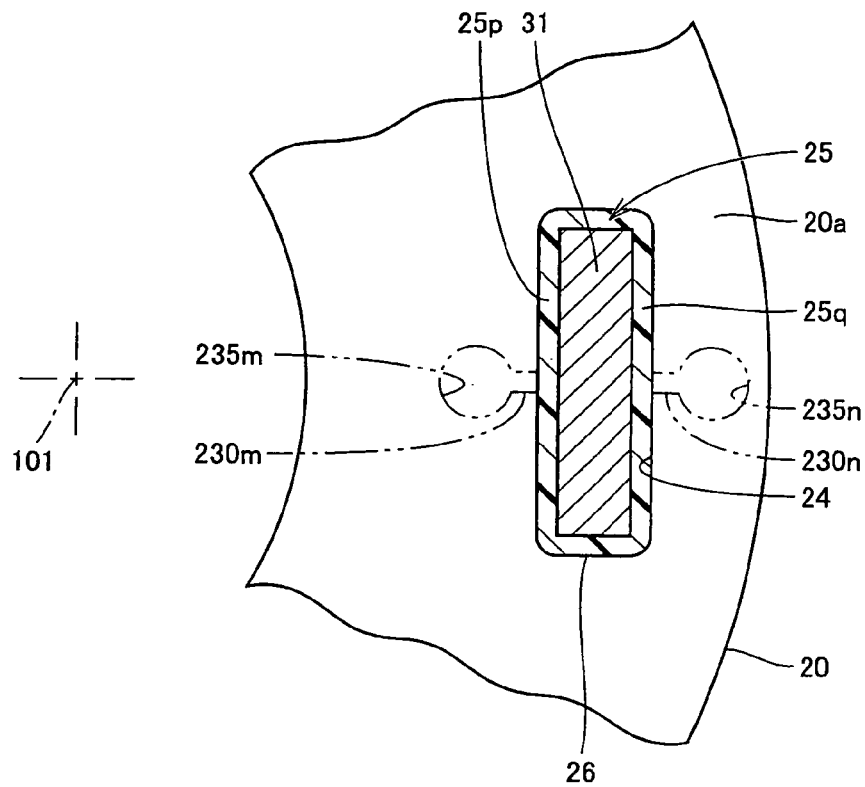
FIG. 10 is an end view of the IPM rotor taken along the line X-X of FIG. 9.

Next, a method of manufacturing IPM rotor 10 using injection apparatus 200 of FIG. 6 will be described. FIGS. 7 to 9 are cross-sectional views showing steps of manufacturing the IPM rotor shown in FIG. 1. FIG. 10 is an end view of the IPM rotor taken along the line X-X of FIG. 9.

Referring to FIG. 7, first, end plate 41 and rotor core 20 are placed in recessed portion 270 of lower mold 260. Referring to FIG. 8, next, permanent magnet 31 is inserted to slot 24 and placed on end plate 41. The steps shown in FIGS. 7 and 8 may be reversed, that is, permanent magnet 31 may be inserted to slot 24 first, and then end plate 41 and rotor core 20 may be placed in recessed portion 270.

Referring to FIGS. 9 and 10, upper mold 220 is placed on lower mold 260. At this time, gates 230m and 230n are arranged at positions opposite to end surface 20a. Gates 230m and 230n are positioned to overlap with gap 25. Gates 230m and 230n overlap with gap 25 at positions displaced in the circumferential direction of gap 25 extending on the outer circumference of permanent magnet 31.

Gap 25 includes an inner circumferential portion 25p formed on the inner circumferential side than permanent magnet 31 and an outer circumferential portion 25q formed on the outer circumferential side, with respect to central axis 101 as the center. Inner circumferential portion 25p and outer circumferential portion 25q extend linearly along end sides of permanent magnet 31. Inner circumferential portion 25p and outer circumferential portion 25q extend along longer ones of longer and shorter sides of permanent magnet 31. Inner circumferential portion 25p and outer circumferential portion 25q extend in a direction orthogonal to the radial direction about central axis 101. Gate 230m overlaps with inner circumferential portion 25p. Gate 230n overlaps with outer circumferential portion 25q. Gates 230m and 230n overlap with approximately the central portions of inner and outer circumferential portions 25p and 25q.

In pressurizing space 235, filler 27 is placed. Pressing mold 215 is loaded to pressurizing space 235. By a down-stroke of pressing mold 215, filler 27 is injected to gap 25 through gates 230m and 230n. Filler 27 is cured, whereby holding member 26 is formed in gap 25. In the present embodiment, filler 27 is injected to gap 25 simultaneously from a plurality of portions where gates 230m and 230n are positioned. Therefore, as compared with an example in which filler 27 is introduced through one portion, filler 27 can be filled more sufficiently in gap 25.

After curing filler 27, end plate 41 and rotor core 20 are removed from recessed portion 270. Referring to FIG. 1, the removed end plate 41 and rotor core 20 are fixed together with end plate 46 on shaft 58. Through the steps described above, IPM rotor 10 shown in FIG. 1 is completed.

The apparatus for manufacturing the IPM rotor in accordance with Embodiment 1 of the present invention is injection apparatus 200 as the apparatus for manufacturing IPM rotor 10 having permanent magnet 31 as the magnet embedded in each of a plurality of slots 24 formed in rotor core 20 as the core body. Injection apparatus 200 has gate 230 as an inlet for introducing filler 27 to gap 25 between the inner wall of slot 24 and permanent magnet 31. A plurality of gates 230 are provided for one slot 24.

According to the method of manufacturing IPM rotor 10 of Embodiment 1, rotor core 20 includes an end surface 20a at which slot 24 is opened. Between permanent magnet 31 and the inner wall of slot 24, gap 25 is formed extending annularly along the outer circumference of permanent magnet 31. The method of manufacturing IPM rotor 10 includes the steps of inserting permanent magnet 31 to slot 24, and injecting filler 27 to gap 25 from a plurality of portions opposite to end surface 20a and displaced in the circumferential direction with respect to extension of gap 25.

The step of injecting filler 27 includes the step of injecting filler 27 to inner circumferential portion 25p and outer circumferential portion 25q.

By the injection apparatus 200 and the method of manufacturing IPM rotor 20 in accordance with Embodiment 1 as described above, gap 25 can sufficiently be filled with filler 27, and therefore, coupling strength of permanent magnet 31 to rotor core 20 can be enhanced. Thus, NV characteristics of IPM rotor 10 can be improved.

If the coupling strength of permanent magnet 31 to rotor core 20 is low, permanent magnet 31 possibly functions as if it were a dynamic damper, resulting in unexpected vibration characteristic of IPM rotor 10. In such a case, there is a possibility that vibration peak of IPM rotor 10 by itself and vibration peak of motor 100 as a whole unit be overlapped and coupled with each other. According to Embodiment 1, coupling strength of permanent magnet 31 to rotor core 20 is enhanced, and such a possibility can be avoided. As a further development, it is possible to intentionally shift the vibration peak of IPM rotor 10 by itself and the vibration peak of motor 100 as the whole unit, by adjusting the coupling strength of permanent magnet 31 to rotor core 20.

In the present embodiment, filler 27 is filled in inner circumferential portion 25p and outer circumferential portion 25q of gap 25. Consequently, it is possible to firmly grip permanent magnet 31 by holding member 26 in the radial direction with respect to central axis 101. Thus, permanent magnet 31 can more securely be held against centrifugal force acting on permanent magnet 31, when IPM rotor 10 rotates.

Next, a modification of injection apparatus 200 and the method of manufacturing IPM rotor 10 of the present embodiment will be described.

Figure 11:
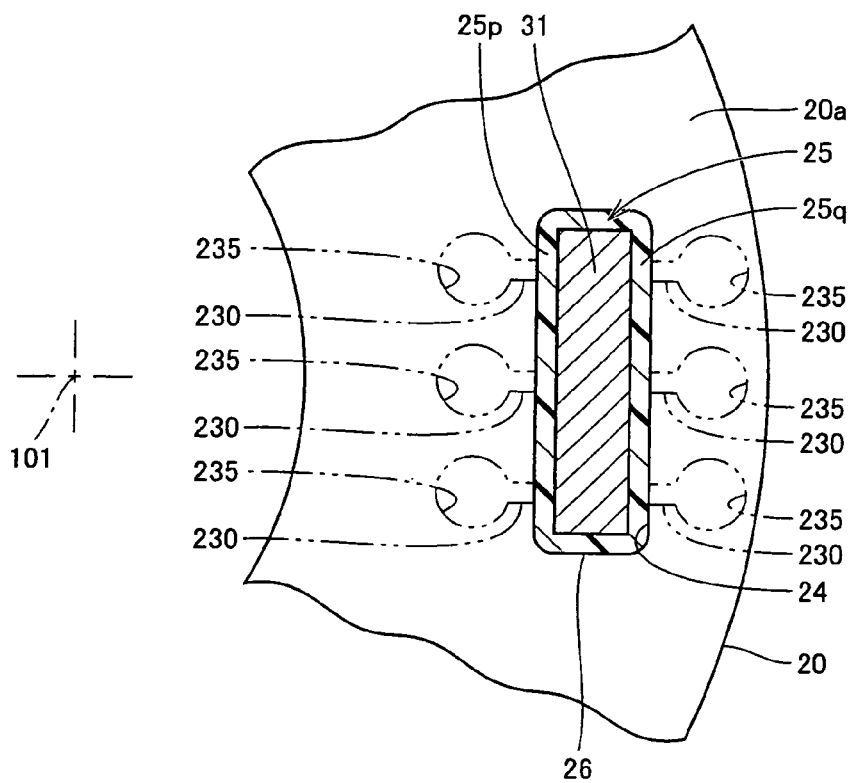
FIG. 11 is an end view of the IPM rotor showing a first modification of the injection apparatus shown in FIG. 6.

FIG. 11 is an end view of an IPM rotor showing a first modification of the injection apparatus shown in FIG. 6. Referring to FIG. 11, in the present modification, a plurality of gates 230 are provided to overlap with a plurality of portions of inner circumferential portion 25p and a plurality of portions of outer circumferential portion 25q of gap 25. The plurality of gates 230 overlapped with inner circumferential portion 25p are arranged at an equal pitch. The plurality of gates 230 overlapped with outer circumferential portion 25q are arranged at an equal pitch. By such a structure, permanent magnet 31 can more reliably be held when IPM rotor 10 rotates.

Figure 12:
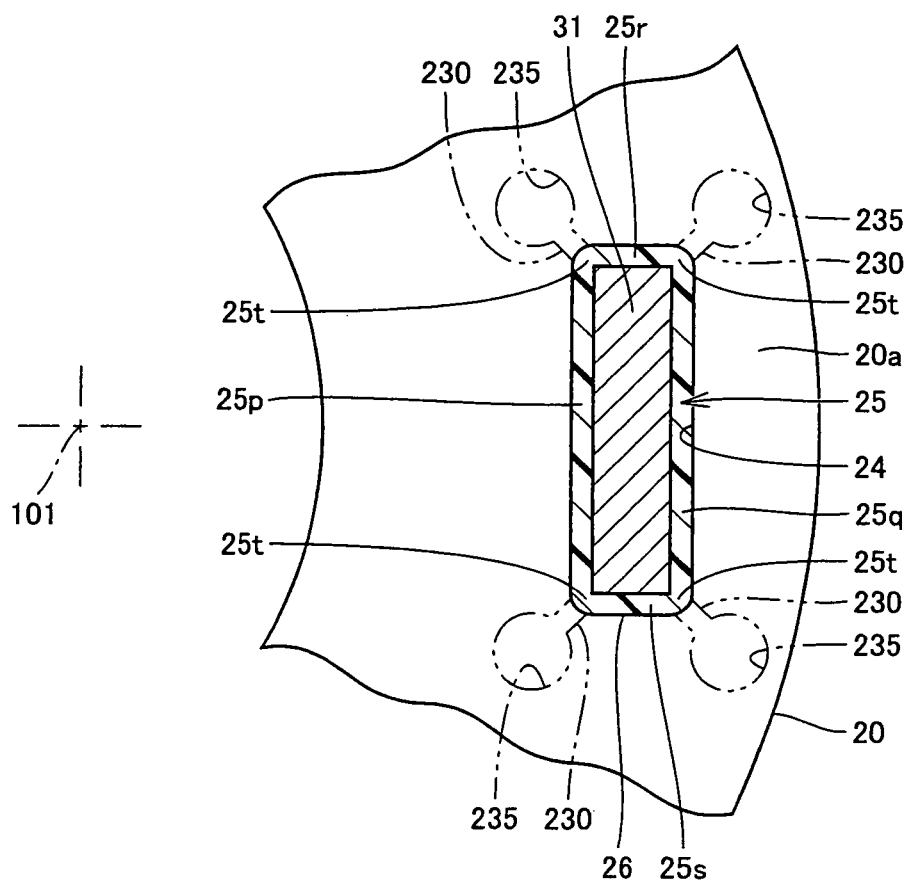
FIG. 12 is an end view of the IPM rotor showing a second modification of the injection apparatus shown in FIG. 6.

FIG. 12 is an end view of an IPM rotor showing a second modification of the injection apparatus shown in FIG. 6. Referring to FIG. 12, gap 25 includes, in addition to inner and outer circumferential portions 25p and 25q, side portions 25r and 25s. Side portions 25r and 25s extend in a direction perpendicular to inner and outer circumferential portions 25p and 25q. Side portions 25r and 25s extend along shorter ones of longer and shorter sides of permanent magnet 31. Side portions 25r and 25s intersect with inner and outer circumferential portions 25r and 25q. Gap 25 includes a plurality of corner portions 25t at positions where side portions 25r and 25s intersect with inner and outer circumferential portions 25p and 25q. In the present modification, a plurality of gates 230 are provided to overlap with corner portions 25t. The plurality of gates 230 are provided to overlap every one of the plurality of corner portions 25t.

Gap 25 includes inner circumferential portion 25p (outer circumferential portion 25q) as the first side and a side portion 25r (side portion 25s) as the second side extending in mutually different directions along the outer circumference of permanent magnet 31 and a corner portion 25t at which the inner circumferential portion 25p (outer circumferential portion 25q) and the side portion 25r (side portion 25s) intersect. Filler 27 is injected to corner portions 25t through the plurality of gates 230.

Filler 27 injected to gap 25 has its fluidity lowered at corner portion 25t, as the direction of its progress changes. According to the present modification, filler 27 is injected to the corner portion 25t and, therefore, gap can be filled with filler 27 more satisfactorily.

Figure 13:
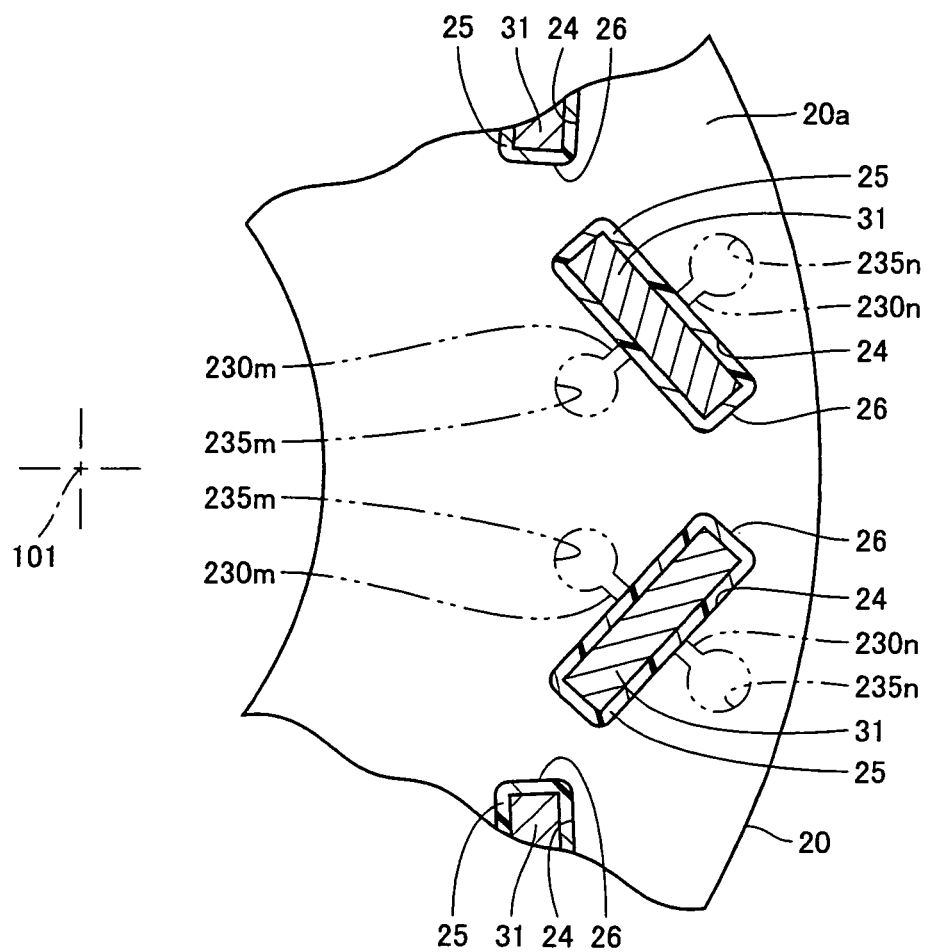
FIG. 13 is an end view showing a modification of the rotor core shown in FIG. 5.

FIG. 13 is an end view showing a modification of the rotor core shown in FIG. 5. Referring to FIG. 13, according to the present modification, slot 24 has an approximately rectangular shape with end side extending in a direction diagonally crossing the radial direction with respect to central axis 101, when viewed from the axial direction of central axis 101. Similar effects as described above can also be attained when the injection apparatus 200 and the method of manufacturing the IPM rotor 10 in accordance with the present embodiment are applied to rotor core 20 having such a structure.

In the present embodiment, application of the present invention to a motor installed in a hybrid vehicle has been described. Application is not limited and the present invention may be applied to a generator installed in a hybrid vehicle, or a motor installed in an electric vehicle. Further, the present invention may also be applied to a general industrial motor.

Embodiment 2

Figure 14A:
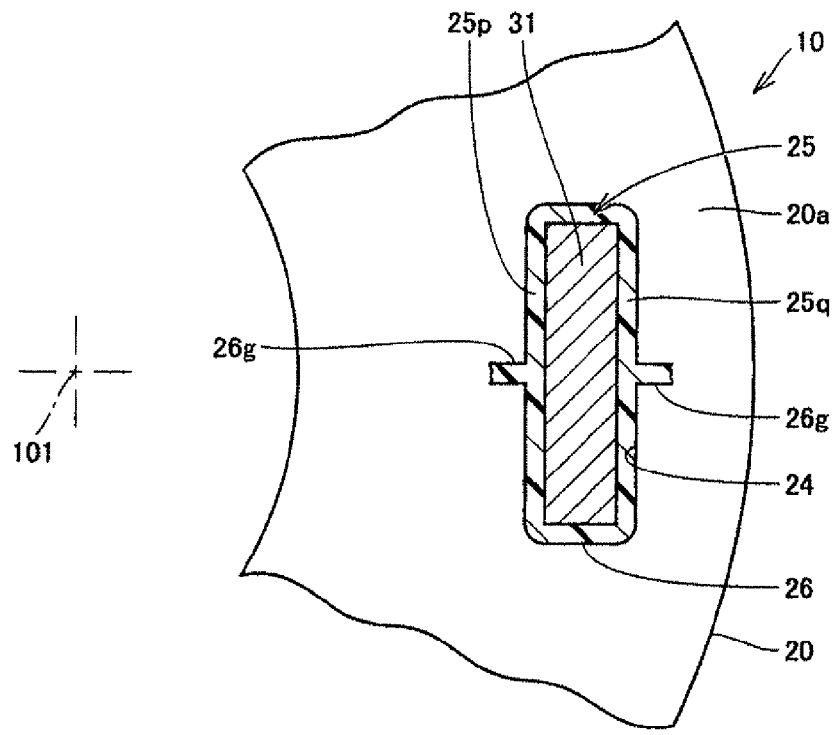
FIG. 14(a) is an end view showing an IPM rotor in accordance with Embodiment 2 of the present invention.

FIG. 14(a) is an end view showing an IPM rotor in accordance with Embodiment 2 of the present invention. FIG. 14(a) corresponds to FIG. 5 of Embodiment 1. IPM rotor 10 of the present embodiment is fabricated using injection apparatus 200 and the method of manufacturing IPM rotor 10 in accordance with Embodiment 1.

Referring to FIG. 14(a), in the present embodiment, holding member 26 includes a plurality of injection traces 26g. The plurality of injection traces 26g are formed as thin films on end surface 20a. The plurality of injection traces 26g are formed continuous from holding member 26 filling inner and outer circumferential portions 25p and 25q. The plurality of injection traces 26g are formed at positions overlapping with gates 230m and 230n of FIG. 10. The plurality of injection traces 26g are traces of injection of filler 27 to gap 25 through gates 230m and 230n, in the steps shown in FIGS. 9 and 10 of Embodiment 1.

Figure 14B:
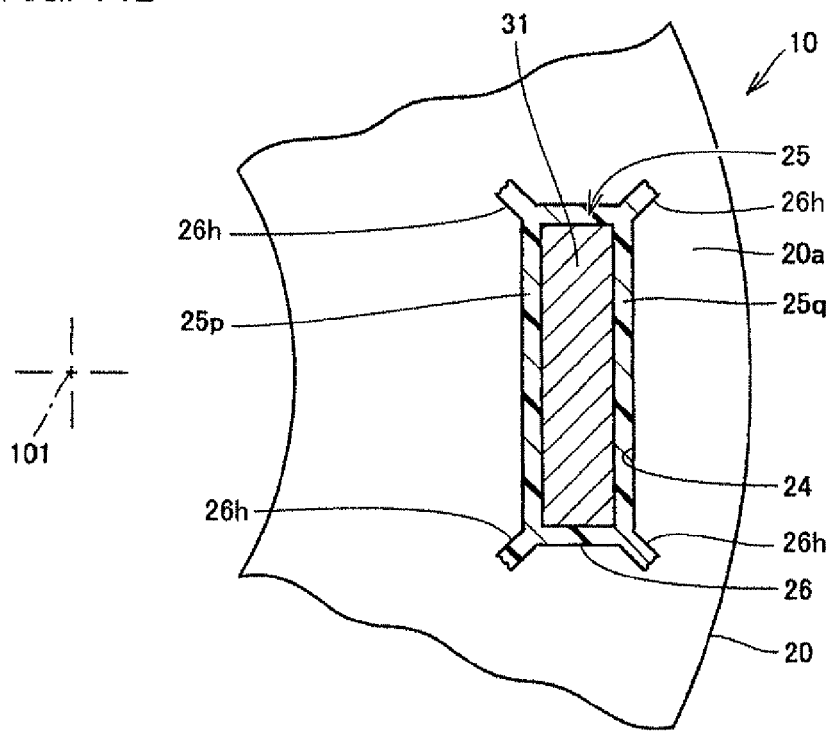
FIG. 14(b) is an end view showing an IPM rotor in accordance with the second modification of Embodiment 2 of the present invention.

FIG. 14(b) is an end view showing an IPM rotor in accordance with a second modification of Embodiment 2 of the present invention. In FIG. 14(b) the plurality of injection traces 26h are formed continuously on said end surface 20a at said plurality of corner portions of holding member 26. The plurality of injection traces 26h are formed at positions overlapping with gates 230 at corner portions 25t of FIG. 12.

IPM rotor 10 in accordance with Embodiment 2 structured as illustrated in FIGS. 14(a) and 14(b) and described above can attain effects similar to those attained by Embodiment 1. The present embodiment does not imply that the IPM rotor fabricated by using the method and apparatus for manufacturing the IPM rotor of the present invention necessarily has the plurality of injection traces of the filler.

Embodiment 3

Figure 15:
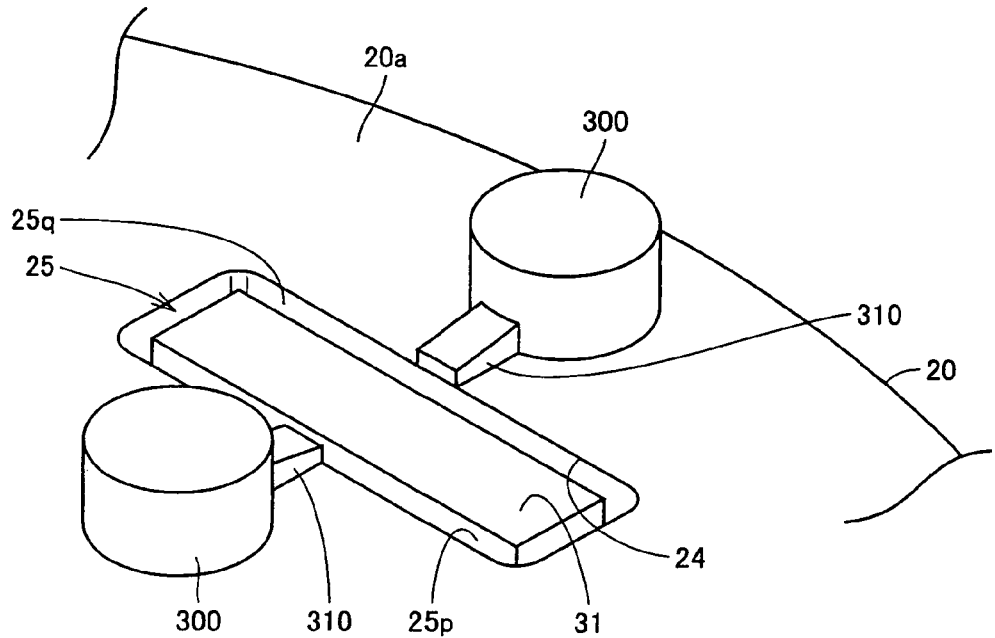
FIG. 15 is a perspective view showing a first step of manufacturing the IPM rotor in accordance with Embodiment 3 of the present invention.
Figure 16:
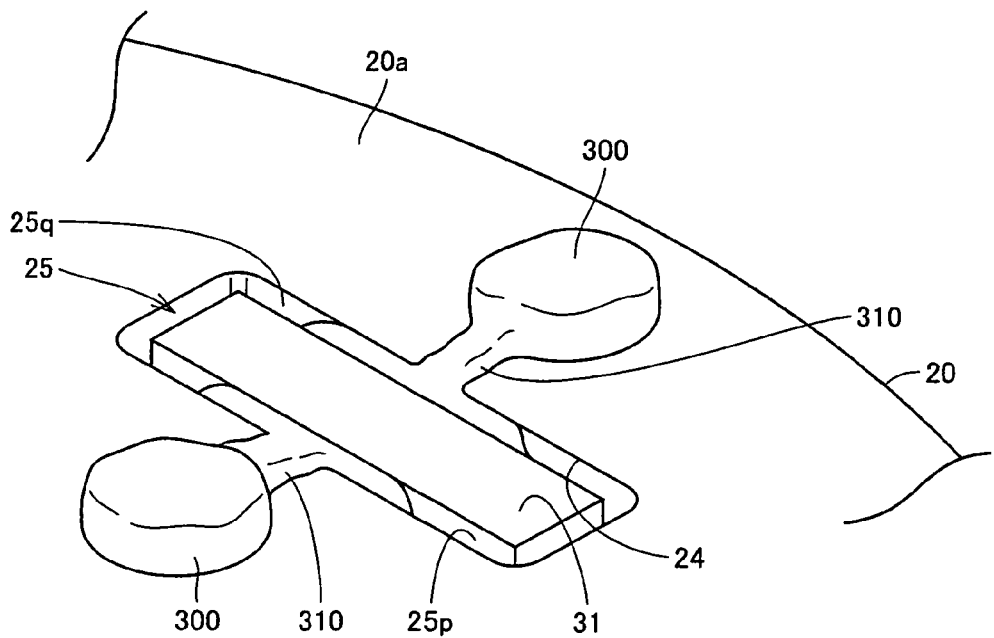
FIG. 16 is a perspective view showing a second step of manufacturing the IPM rotor in accordance with Embodiment 3 of the present invention.

FIGS. 15 and 16 are perspective views showing steps of manufacturing the IPM rotor in accordance with Embodiment 3 of the present invention. The method of manufacturing the IPM rotor in accordance with the present embodiment includes some steps similar to those of the method of manufacturing the IPM rotor in accordance with Embodiment 1. In the following, description of overlapping steps will not be repeated.

Referring to FIG. 15, in the present embodiment, a plurality of fillers 300 are placed on end surface 20a. Positions where fillers 300 are placed are not limited to those shown in FIG. 15, and the positions may be those shown in FIGS. 11 and 12 of Embodiment 1. Filler 300 is formed by solidifying resin material as the raw material of holding member 26. Filler 300 includes a gate portion 310. Gate portion 310 is formed integrally with filler 300 by the resin material. Each of the plurality of fillers 300 is arranged such that respective gate portions 310 overlap with inner and outer circumferential portions 25p and 25q.

Referring to FIG. 16, next, the solid filler 300 is melt. Filler 300 that comes to have fluidity gradually flows to gap 25 through gate portion 310, and the gap is filled with filler 300. In the present embodiment, filler 300 is introduced through a plurality of portions to gap 25, and therefore, more satisfactory filling with filler 300 becomes possible.

By the method of manufacturing the IPM rotor in accordance with Embodiment 3 structured as described above, effects similar to those attained by Embodiment 1 above can be attained. In addition, in the present embodiment, filler 300 flows to gap 25 because of its own weight. As compared with Embodiment 1 in which filler 27 is filled while applying pressure, it becomes more difficult to fill gap 25 with filler 300. Therefore, effect of improved filling characteristic of filler 300 is particularly significant.

The injection apparatus 200, IPM rotors 10 and manufacturing methods thereof described with reference to FIGS. 1 to 3 above may be combined appropriately.

Although the present invention has been described and illustrated in detail, it is clearly understood that the same is by way of illustration and example only and is not to be taken by way of limitation, the spirit and scope of the present invention being limited only by the terms of the appended claims.

INDUSTRIAL APPLICABILITY

The present invention is mainly applicable to a motor mounted on a hybrid vehicle or an electric vehicle.

The invention claimed is:

1. A method of manufacturing an IPM (Interior Permanent Magnet) rotor having a magnet embedded in a slot formed in a core body, wherein
    said core body includes an end surface having the slot opened at said end surface;
    said method comprising the steps of:
        inserting said magnet into said slot; and
        injecting a filler to a gap between an inner wall of said slot and said magnet at a plurality of corner portions to form a holding member for holding said magnet on said core body, wherein
    said holding member includes a plurality of injection traces of said filler formed as thin films on said end surface arranged spaced from each other along an opening edge of said slot,
    said gap includes a plurality of sides extending in different directions along the outer circumference of said magnet and the plurality of corner portions, the plurality of corner portions disposed where at least two sides of the plurality of sides intersect,
    said plurality of injection traces are formed continuously on said end surface at said plurality of corner portions, and
    said plurality of injection traces have ends on said end surface and extend between said ends and said plurality of corner portions, respectively.

2. The method of manufacturing an IPM rotor according to claim 1, wherein said step of injecting said filler includes the steps of placing a solid filler on said end surface at said plurality of corner portions, and causing said filler to flow into said plurality corner portions of said gap by melting said solid filler.

3. An IPM rotor, comprising:
    a core body including an end surface and having a slot opened at said end surface;
    a magnet inserted to said slot; and
    a holding member formed by a filler injected to a gap between an inner wall of said slot and said magnet at a plurality of corner portions, for holding said magnet on said core body; wherein
    said holding member includes a plurality of injection traces of said filler formed as thin films on said end surface arranged spaced from each other along an opening edge of said slot,
    said gap includes a plurality of sides extending in different directions along the outer circumference of said magnet and the plurality of corner portions, the plurality of corner portions disposed where at least two sides of the plurality of sides intersect, said plurality of injection traces are formed continuously on said end surface at said plurality of corner portions, and said plurality of injection traces have ends on said end surface and extend between said ends and said plurality of corner portions, respectively.

* * * * *